United States Patent
Pal

(12) United States Patent (10) Patent No.: US 7,541,563 B1
Pal (45) Date of Patent: Jun. 2, 2009

(54) MAGNETIC GYRO-PROJECTILE DEVICE WITH ELECTRONIC COMBUSTION, TURBOGENERATION AND GYRO STABILIZATION

(76) Inventor: Anadish Kumar Pal, 194 Vaishali, Pitampura, Delhi (IN) 110088

( * ) Notice: Subject to any disclaimer, the term of this patent is extended or adjusted under 35 U.S.C. 154(b) by 0 days.

(21) Appl. No.: 11/546,296

(22) Filed: Oct. 12, 2006

(51) Int. Cl.
  F42B 10/02 (2006.01)
  F42B 10/00 (2006.01)
  F42B 15/00 (2006.01)
(52) U.S. Cl. .................. 244/3.1; 244/3.23; 89/1.51; 89/1.55; 102/200; 102/206; 102/207; 102/208; 102/209; 102/473; 102/501
(58) Field of Classification Search ........... 244/3.1–3.3; 102/206–220, 200, 473, 501–529; 310/300, 310/308–310; 89/1.51, 1.55, 1.11
See application file for complete search history.

(56) References Cited

U.S. PATENT DOCUMENTS 2,853,009 A * 9/1958 Bianchi ................ 102/207
2,882,824 A * 4/1959 Larsen et al. ............. 102/207
2,892,412 A * 6/1959 Mullins et al. ........... 102/207
3,877,378 A * 4/1975 Clark et al. ............... 102/207
3,886,867 A * 6/1975 Krupen .................... 102/207
3,967,141 A * 6/1976 Gawlick et al. .......... 102/210
4,037,517 A * 7/1977 Briggs et al. ............. 102/210
5,485,788 A * 1/1996 Corney .................... 102/210
6,082,267 A * 7/2000 Cooper .................... 102/209

* cited by examiner

Primary Examiner—Bernarr E Gregory

(57) ABSTRACT

A hollow cylinder has an electromagnet to hold back a canister and either an induction heating linear actuator or a firing pin to ignite the primer-containing combustive material inside the canister to eject a locked piston from the cylinder. There is a motor-included turbogenerator around the cylinder, which converts the energy of the post-combustion gases into electricity to get stored and to power an integrated or separate annular stator assembly to give the ejected piston a rotatory motion for stability in projectile motion. Another device has a helically arranged, multi-pole permanent magnet assembly annularly integrated around the cylinder to give the ejected piston a rotatory motion for stability in projectile motion. In other forms, an annular stator assembly around the cylinder is supplied with switched, externally generated electric power without either a turbogenerator or the motor-included turbogenerator to respectively produce electricity or to provide gyroscopic stability to the cylinder.

20 Claims, 3 Drawing Sheets

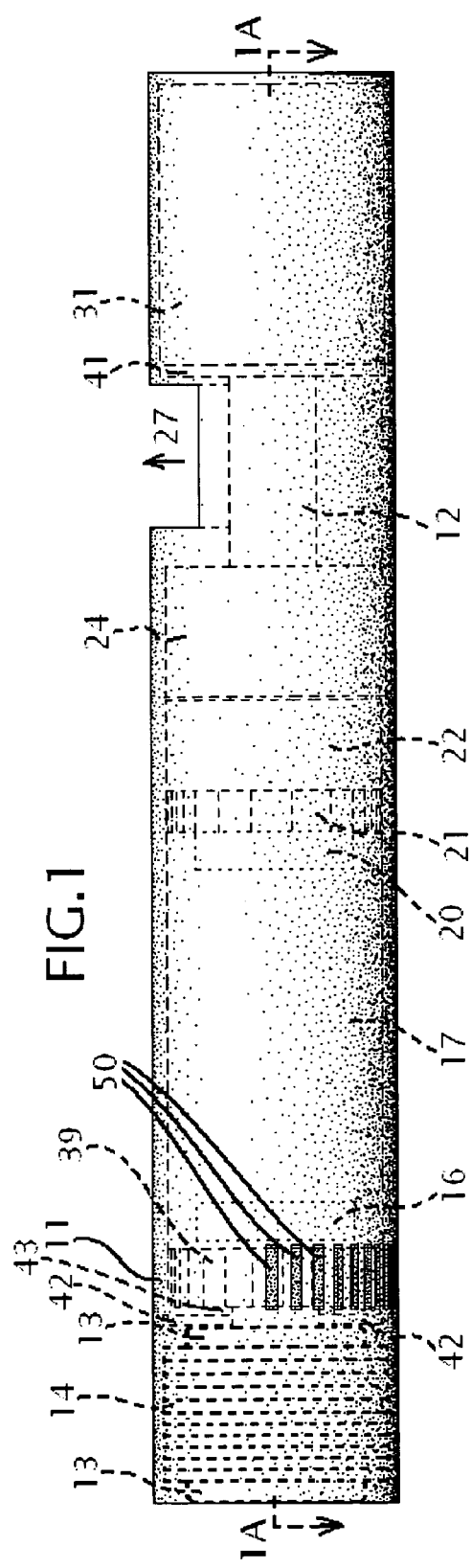
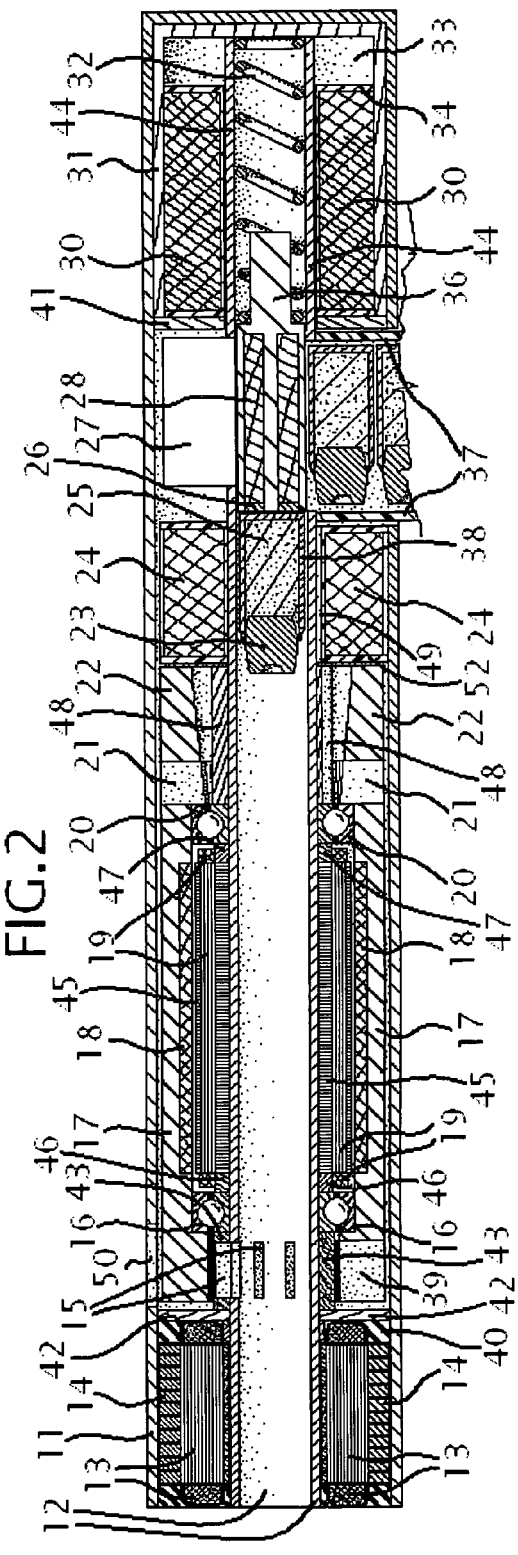

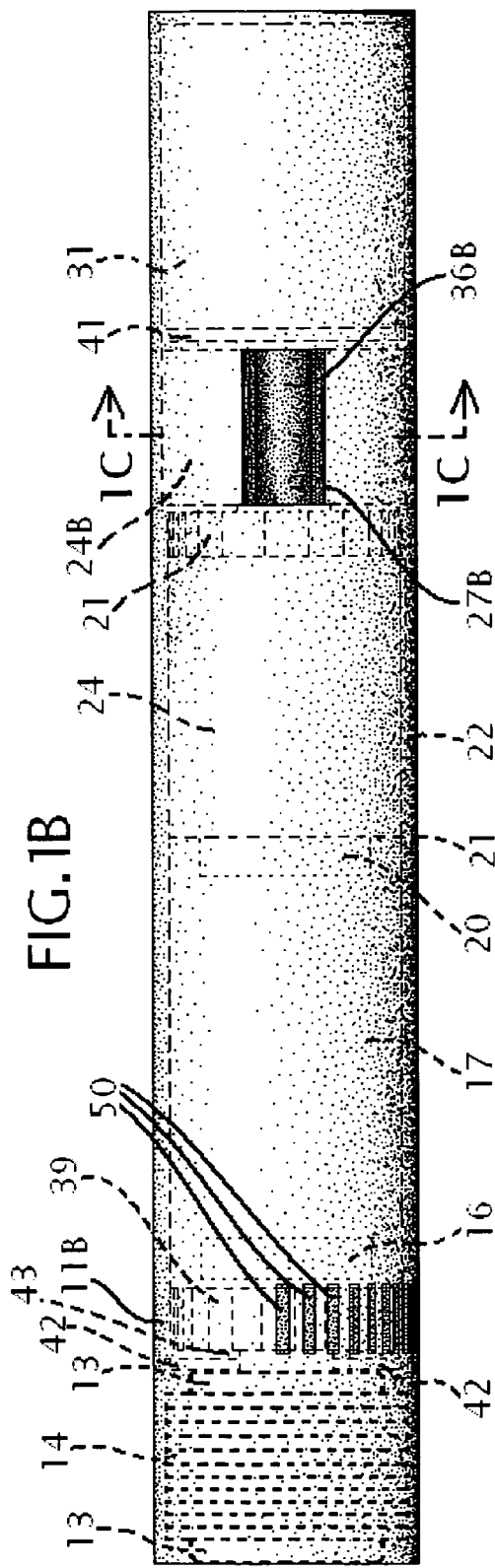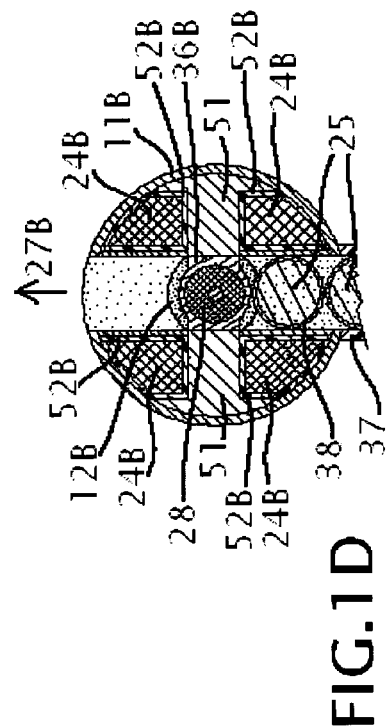

MAGNETIC GYRO-PROJECTILE DEVICE WITH ELECTRONIC COMBUSTION, TURBOGENERATION AND GYRO STABILIZATION

CROSS-REFERENCE TO RELATED APPLICATIONS

Foreign application priority claimed from Indian Patent Application No. 1443/DEL/2006 of Jun. 16, 2006 of entitled, 'Magnetic gyro-projectile device with electronic combustion, turbogeneration and gyro stabilization,' the contents of which are incorporated herein by reference.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention is directed to the field of internal combustion devices employing a cylinder and consecutively replaceable piston projectiles for marksmanship.

Prior art employs tribo-activated combustion devices of similar function but is fully mechanical in operation; it also has problems of mechanical instability and maneuverability. The issue of impartation of gyroscopic stability to the projectile has a power penalty and additional maintenance problems.

BRIEF SUMMARY OF THE INVENTION

In the present invention, primarily, a smooth bore cylinder of mainly nonmagnetic and/or dielectric material is employed with a piston which is accompanied with a combustive material to effect combustion inside an enclosable confine of the cylinder. Various versions of the present invention offer approaches to the problems present in prior art in following manners:

In one embodiment of the present invention, the cylinder has external electromagnetic means to magnetically hold ferromagnetic can-type enclosable confine, and a medium frequency induction heating linear actuator to fire the primer-containing combustive material inside the can-type enclosable confine. There is a motor-included turbogenerator annularly and rotatably integrated around the cylinder, which converts the kinetic energy of the post-combustion exhaust gases into electric power to get stored appropriately and to power a stator assembly again annularly integrated around the cylinder opening from which the piston is ejected. The ejected piston is imparted a rotatory motion by the stator assembly powered appropriately through electronic switching devices.

In the second embodiment of the present invention, the cylinder has external electromagnetic means to magnetically hold ferromagnetic can-type enclosable confine, and a medium frequency induction heating linear actuator to fire the primer-containing combustive material inside the can-type enclosable confine. There is a motor-included turbogenerator annularly and rotatably integrated around the cylinder, which converts the kinetic energy of the post-combustion exhaust gases into electric power to get stored appropriately. The ejected piston is imparted a rotatory motion by the rotating magnetic field leaking inwardly from the stator assembly of the motor-included turbogenerator.

In the third form of the present invention, the cylinder has external electromagnetic means to magnetically hold ferromagnetic can-type enclosable confine, and a linear actuator with a tribo-heating pin to fire the primer-containing combustive material inside the can-type enclosable confine. There is a motor-included turbogenerator annularly and rotatably integrated around the cylinder, which converts the kinetic energy of the post-combustion exhaust gases into electric power to get stored appropriately and to power a stator assembly again annularly integrated around the cylinder opening from which the piston is ejected. The ejected piston is imparted a rotatory motion by the stator assembly powered appropriately through electronic switching devices.

In the fourth form of the present invention, the cylinder has external electromagnetic means to magnetically hold ferromagnetic can-type enclosable confine, and a linear actuator with a tribo-heating pin to fire the primer-containing combustive material inside the can-type enclosable confine. There is a motor-included turbogenerator annularly and rotatably integrated around the cylinder, which converts the kinetic energy of the post-combustion exhaust gases into electric power to get stored appropriately. The ejected piston is imparted a rotatory motion by the rotating magnetic field leaking inwardly from the stator assembly of the motor-included turbogenerator.

In the fifth form of the present invention, the cylinder has external electromagnetic means to magnetically hold ferromagnetic can-type enclosable confine, and a medium frequency induction heating linear actuator to fire the primer-containing combustive material inside the can-type enclosable confine. There is a motor annularly and rotatably integrated around the cylinder and a stator assembly again annularly integrated around the cylinder opening from which the piston is ejected. There is an electric power source to supply power the motor and the stator assembly. The ejected piston is imparted a rotatory motion by the stator assembly powered appropriately by the electric power source, through electronic switching devices.

In the sixth form of the present invention, the cylinder has external electromagnetic means to magnetically hold ferromagnetic can-type enclosable confine, and a linear actuator with a tribo-heating pin to fire the primer-containing combustive material inside the can-type enclosable confine. There is a motor annularly and rotatably integrated around the cylinder. There is an electric power source to supply power the motor. The ejected piston is imparted a rotatory motion by the rotating magnetic field leaking inwardly from the stator assembly of the motor.

In the seventh form of the present invention, a motor has a helically arranged, multi-pole permanent magnet stator assembly annularly and fixedly integrated around the cylinder to impart on the ejected piston a rotatory motion for gyroscopic stability in projectile motion. This form of the present invention can be implemented to all the earlier listed forms of the present invention by replacing the earlier mentioned means to impart a rotatory motion to the ejected piston with this form of the present invention.

In the eighth form of present invention, a motor has a helically arranged, multi-pole permanent magnet stator assembly annularly and fixedly integrated around the muzzle or barrel of a firearm of common unrifled construction to impart on an ejected metallic bullet a rotatory motion for gyroscopic stability in projectile motion.

To further the understanding of various forms of the present invention, the following drawings depict some of the functional and constructional details of the present invention, which also help in the understanding of the detailed description of the preferred embodiments.

BRIEF DESCRIPTION OF THE SEVERAL VIEWS OF THE DRAWINGS

Accompanying drawings on 3 sheets are 6 in number.

FIG. 1 is a schematic side view of the projectile device with two separate gyro motors and solenoid-type canister hold back electromagnetic means.

FIG. 1B is a schematic plan view of the projectile device with two separate gyro motors and clamp-type canister hold back electromagnetic means.

FIG. 1D is a sectional view taken along line 1C-1C to show the internal schematic details of the projectile device with two separate gyro motors and clamp-type canister hold back electromagnetic means.

FIG. 2 is a sectional view taken along line 1A-1A in FIG. 1 to show the internal schematic details of the projectile device of the present invention with two separate gyro motors.

DETAILED DESCRIPTION OF THE INVENTION

Figure 3:
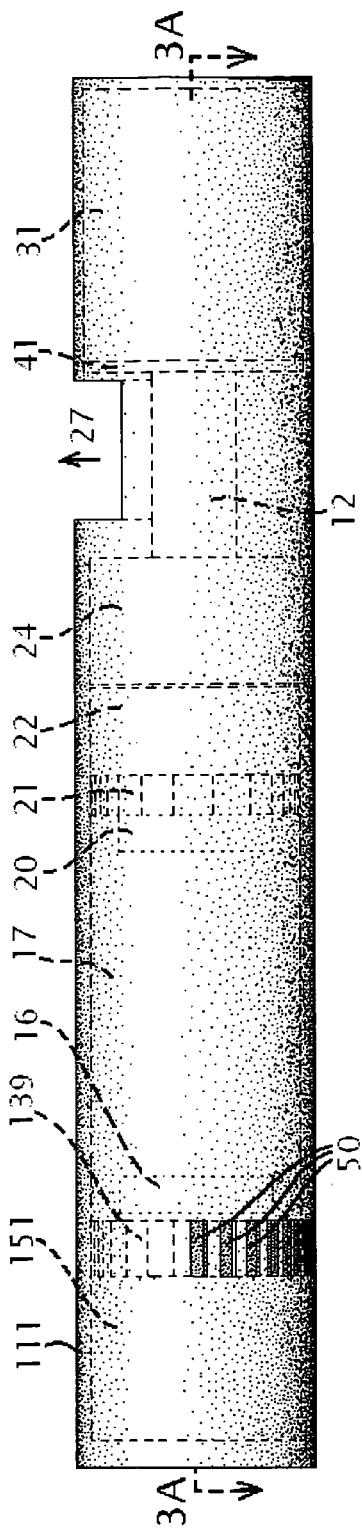
FIG. 3 is a schematic side view of the projectile device with an integrated gyro motor.

Showing the first form of the present invention, in FIG. 1 and FIG. 2, cylinder 12 has external electromagnetic means in the form of canister-holder solenoid coil 24 to magnetically hold ferromagnetic can-type enclosable confine formed by canister 38, linear actuator core 36 and piston 23 (FIG. 2). Cylinder 12 has variable outer diameters and has a cylindrical hollow spanning the entire altitude of cylinder 12. Linear actuator core 36 is pushed forward by actuator spring 32 (FIG. 2) to be stopped by canister 38 to fire primer-containing combustive material 25 inside canister 38 (all in FIG. 2). In FIG. 2, canister 38 is magnetically locked in place in cylinder 12 by the activation of canister-holder solenoid coil 24 (wound on solenoid dielectric bobbin 52) is the external electromagnetic means to magnetically hold back canister 38 filled with primer-containing combustive material 25 and locked with piston 23 of at least outer metallic construction inside the cylindrical hollow of cylinder 12 (and 112 in FIG. 4). Here, canister 38 is of ferromagnetic construction; however, in the preceding description, the use of firearm cartridges of prevalent non-magnetic construction instead of canister 38 are explained, after minor modifications to the construction of the external electromagnetic means to magnetically hold back a non-magnetic firearm cartridge, instead of canister 38, as mentioned hereinabove.

An induction heating linear actuator, mainly made up of a core and a coil, fires the primer-containing combustive material 25 leading to combustion and the release of piston 23 from canister 38. Linear actuator core 36 is made with a low-loss medium-frequency ferromagnetic material with a fairly high saturation flux density; linear actuator coil 28 (with a canister-side dielectric covering ring 26, FIG. 2) is energized with medium frequency ac and dc to successively heat the circular bottom of canister 38 to effect the combustion of primer-containing combustive material 25 and to magnetically attract canister 38 for pull back from its shown location in FIG. 2 for ejection port 27 (FIG. 1, FIG. 2, FIG. 3 and FIG. 4) after the combustion. The pull back is effected primarily by the energizing of linear actuator solenoid coil 30 wound on dielectric solenoid bobbin 34 (FIG. 2); inside tube 44 preferably be made of a dielectric material, as inside tube 44 is never subjected to high pressures. The magnetic circuit to linear actuator solenoid coil is formed by linear actuator solenoid housing 31 (FIG. 1 and FIG. 2) and solenoid circular plate 41 (FIG. 2). Empty space 33 inside linear actuator solenoid housing 31 (FIG. 2) is used for the necessary logic circuitry and electronic switching circuitry; electric power storage devices in the form of rechargeable battery or capacitors are to be accommodated either by extending empty space 33 or behind empty space 33 by making appropriate openings through linear actuator solenoid housing 31 and external housing 11 (FIG. 1 and FIG. 2) which also function as cover means to close the rear-end base of cylinder 12 (and 112 in FIG. 4). Actuator spring 32 also acts as an electrical conductor forming a coaxial or single conductor cable connecting the electronic switching circuitry in empty space 33 to linear actuator coil 28. Canister holder cartridge 37 (FIG. 2) is preferably made of a thermoplastic material with a spring-based pusher mechanism pushing canisters into the receiver space at an appropriate time when the induction-heating linear actuator core 36 is pulled back fully by an electrically energized linear actuator solenoid coil 30. There is a motor-included turbogenerator annularly and rotatably integrated around cylinder 12, which converts the kinetic energy of the post-combustion exhaust gases into electric power to get stored in storage means in the form of storage (rechargeable) batteries and/or capacitors discussed hereinabove, and to power a stator assembly (electromagnetic rotor means) again annularly integrated around the front-end base opening to cylinder 12 from which piston 23 is ejected by the pressure of the post-combustion exhaust gases. While getting ejected, piston 23 (of metallic electrically conductive construction or encased with an electrically conductive metal) is imparted a rotatory motion by the stator assembly (electromagnetic rotor means) variably powered appropriately through electronic switching devices. The stator assembly consists of stampings 14 (FIG. 1 and FIG. 2), stator winding 13 (FIG. 1 and FIG. 2) and resilient filling 40 (FIG. 2). The motor-included turbo-generator consists of front bearing 16 and rear bearing 20 rotatably fixing hollow rotor shaft 17 having permanent magnet assembly 18 on the inside cylindrical surface of hollow rotor shaft 17 which also has on its front end angularly spaced airfoil or bucket blades 39 forming a reaction or impulse turbine blade assembly where the direction of pressurized gas flow is radial rather than axial. Hollow rotor shaft 17 also has on the rear end airfoil blades forming a centrifugal fan. These centrifugal fan airfoil blades 21 (FIG. 2) are placed radially to suck the air around the outside of cylinder 12 from near the location the combustion takes place inside cylinder 12 to increase the cooling of cylinder 12 which gets heated after successive combustion cycles. Gyro-wheel 22 is a flywheel which extends rearwards from centrifugal fan airfoil blade tips to provide gyroscopic stability to this form of present invention, which increases the operational maneuverability. Angularly spaced airfoil or bucket blades 39 forming a turbine blade assembly have guide vane slots 15 (FIG. 2, FIG. 4) which are airfoil shaped for a reaction turbine and jet shaped foe an impulse turbine. A multi-stage reaction turbine can replace this simple turbine, if high efficiency is essential. However, incorporating a multi-stage reaction turbine in the present form of invention would entail the radial outflow of exhaust gases from guide vane slots 15 to be modified to become axially rearward; this modification would add to the length of cylinder 12. A longer cylinder 12 and a better electrical power conversion would result in accelerating the combustion rate by making a complete combustion cycle faster;

this would also result in more accuracy in targeting of the projectile path to piston 23 after it leaves cylinder 12. Exhaust guide vane slots 50 (partially shown in FIG. 1, FIG. 1B and FIG. 2, in order to show other details too) protect airfoil or bucket blades 39 from foreign bodies. However, a fender in the form of a hand grip or similar device should be used to shroud the exhaust guide vane slots 50, so that the exhaust gases from cylinder 12 is diverted in a manner as to effectively prevent the entry of any foreign particle into cylinder 12. The air sucked by the centrifugal fan is either directed to exhaust guide vane slots 50 or to a separate opening placed inside or towards canister holder cartridge 37 after collecting inside an annular chamber (not shown in the figures) surrounding fan exhaust slots (not shown in the figures) in external housing 11. If the air sucked by the centrifugal fan is directed to exhaust guide vane slots 50, the clearance between the inside cylindrical surface of external housing 11 and the outer cylindrical surface of hollow rotor shaft 17 has to be contoured (not shown in the figures) in order to offer a venturi-like annular shape to the centrifugal fan exhaust; thereby effecting suction of the centrifugal fan exhaust by the high velocity exhaust gases coming out of cylinder 12. Front bearing 16 and rear bearing 20 are rolling type high-speed bearings, as the rpm of the turbogenerator can be as high as 50,000. Cylinder rings plate 42 acts as a radial partition between the turbogenerator section and the stator assembly annularly integrated around the cylinder opening from which the piston is ejected. Cylinder rings 43, 46, 47 and 48 are used to reinforce cylinder 12 and to locate front bearing 16 and rear bearing 20 on cylinder 12 together with turbogenerator stator stack 45 and turbogenerator stator winding 19. After a small radial air gap of around 200 microns, there is permanent magnet rotor assembly 18 fixed on the inside cylindrical side of hollow rotor shaft 17. Air inlet channels 49 allow air entry to the centrifugal fan on cylinder 12, cooling the outside of cylinder 12 and the inside cylindrical surface of canister-holder solenoid coil 24.

Figure 4:
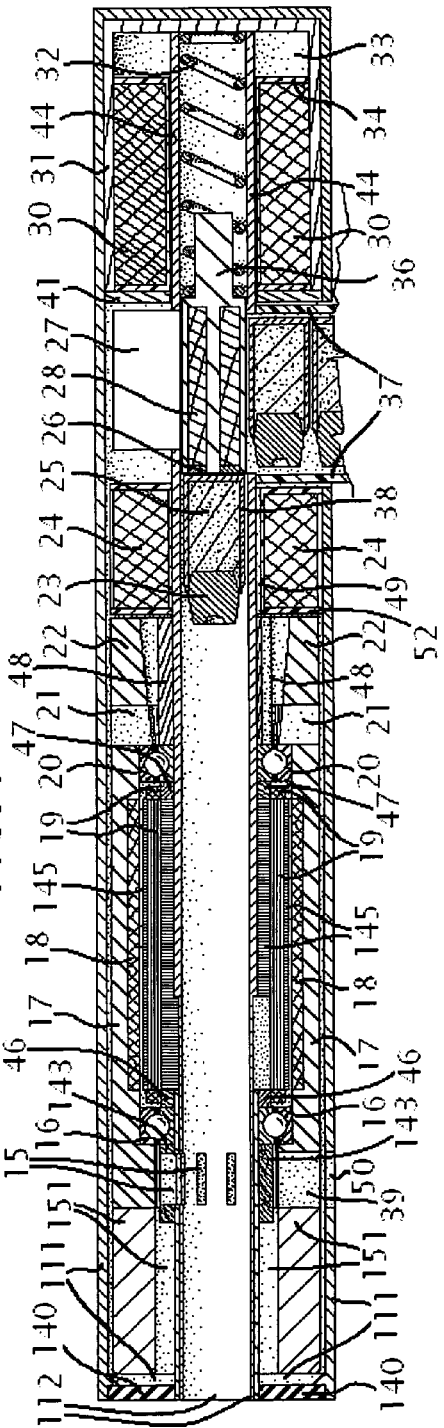
FIG. 4 is a sectional view taken along line 3A-3A in FIG. 3 to show the internal schematic details of the projectile device of the present invention with an integrated gyro motor.

The second form of the present invention is shown with the help of FIG. 3 and FIG. 4. The combustion sequence here is similar to as described hereinabove. But here, during ejection, piston 23 is imparted a rotatory motion by the rotating magnetic field (electromagnetic rotor means) leaking inwardly from motor-included turbogenerator stator assembly which is shown as turbogenerator stator stack 145 (FIG. 4) of the motor-included turbogenerator. In FIG. 3 and FIG. 4, the indicia identical to the ones shown on FIG. 1 and FIG. 2 have identical constructions and functions. Cylinder 112 is of the same construction as cylinder 12, but in FIG. 4 a modified construction is shown with cylinder 112 made in two steps, the rear portion of the cylinder inside which combustion takes place, has a larger outside diameter for strength; the front portion of cylinder 112 has a thin wall and consequently the outside diameter of that portion is less. As a result, turbogenerator rotor stack 145 has a stepped variation in the inside diameter to fit the described shape of cylinder 112. Cylinder ring 143 functions in the manner of cylinder ring 43 (FIG. 1) described hereinabove. Front gyro-wheel 151 connected to angularly spaced airfoil or bucket blades 139 adds to the gyroscopic stability of this form of the present invention. External housing 111 is supported on the front by resilient ring 140, on the rear end, external housing 111 is joined to inside tube 44 which in turn is joined to cylinder 112; this enhances the accuracy of this version of the present invention. External housing 111 is different only in the manner of having an inside resting lip to resilient ring 140. It is reiterated that the basic combustion sequence in this second form of the present invention is totally identical to the one described hereinabove for the first form of the present invention. However, the manner in which, while ejection, piston 23 is imparted a rotatory motion by the rotating magnetic field (electromagnetic rotor means) leaking inwardly from turbogenerator stator stack 145 (FIG. 4) of the motor-included turbogenerator, necessitates that the motor-included turbogenerator is always brought into rotation prior to triggering the combustion of primer-containing combustive material 25 inside canister 38; otherwise, the rpm of the motor-included turbogenerator will remain less than effective to impart sufficient rotatory motion to piston 23 on way to ejection.

Complementing the first and second forms of the present invention, in FIG. 1B and FIG. 1D, a clamp-type canister hold back electromagnetic means consisting of two pole pieces 51, electromagnet dielectric bobbins 52B and external electromagnetic housing 11B magnetically clamps actuator core 36B. Ejection top port 27B (FIG. 1B, FIG. 1D) is for the ejection of empty canister or firearm cartridge after combustion (canister 38 in FIG. 1D after combustion). Ejection top port 27B is similar to ejection port 27 of FIG. 1, FIG. 2, FIG. 3 and FIG. 4, except for the fact that the empty canister or firearm cartridge comes out vertically upward rather that vertically downward. External electromagnetic housing 11B has circular magnetic circuit elements to complete the magnetic circuit consisting of two pole pieces 51 and actuator core 36B; for this purpose, the whole body of external electromagnetic housing 11B can be made of a ferromagnetic material like mild steel. The sequence of events leading to the taking place of combustion inside canister 38 is the same as described in detail in the first and second forms of the present invention, the only minor differences are in the manner canister 38 is magnetically held back and the canister or firearm cartridge extraction process in case of the canister or firearm cartridge being made of a non-magnetic material. First, instead of canister 38 held back directly by canister-holder solenoid coil 24 and its associated components, here, canister 38, or a firearm cartridge is held back by magnetically clamping actuator core 36B, as explained hereinabove. Secondly, if canister 38 or a firearm cartridge is wholly of non-magnetic construction, an electronic proximity or barrier sensor placed towards the front-end side of cylinder 12 (or 112 in FIG. 4), beyond guide vane slots 15, is used to sense the travel of piston 23 inside cylinder 12 or 112 and to give commands through a micro-electronic processing circuitry to the electronic switches to stop supplying dc current to canister-holder coil 24B for energizing the clamp-type canister hold back electromagnetic means (FIG. 1D) and to start supplying a dc current to linear actuator solenoid coil 30. Appropriate timing of the two commands insure that the post-combustion exhaust gas pressure pushes back the empty canister 38 as actuator core 36B is pulled back by the energizing of linear actuator solenoid coil 30. The possible fact that the firearm cartridge be wholly of non-magnetic conventional construction results in changing the frequency for induction heating of the induction heating linear actuator which fires the primer-containing combustive material inside the firearm cartridge leading to a combustion and the release of bullet piston from the firearm cartridge. Linear actuator core 36 in this case is made with a low-loss high-frequency ferromagnetic material; linear actuator coil 28 (with a canister-side dielectric covering ring 26, FIG. 2) is energized with high frequency ac to heat the thin percussion cap at the center of the circular bottom of firearm cartridge to detonate the primer for the combustion of the primer-containing combustive material inside the firearm cartridge.

It is also important to stop foreign particles from entering cylinder 12 in FIG. 2, 12B in FIG. 1D (or 112 in FIG. 4). To achieve this, two solenoid valves are oppositely and diametrically placed terminal to the front end of cylinder 12, 12B and 112 (not shown in the figures) are actuated with the trigger command given to all forms of the present invention for electronically controlled activation of either the induction heating linear actuator or the linear actuator with a tribo-heating pin to fire the primer-containing combustive material leading to the combustion and the release of the piston or bullet from the canister or the firearm cartridge. This insures that only after the combustion takes place inside canister 38, the front end opening to cylinder 12 (12B and 112 also) opens to eject piston 23 (or bullet piston) after the combustion. Approximate calculations show that piston 23 takes around 10 milliseconds to reach the front opening; if the front opening is kept closed, as soon as piston 23 starts moving inside cylinder 12 (12B, 112), the air pressure inside it increases and as a result, air at high pressure starts coming out of guide vane slots 15 (FIG. 2, FIG. 4) and powers the motor-included turbogenerator. In mechanized automatic firearms of prior art, only the exhaust gas operation is utilized for the automatic functioning of the firearms. It is not possible to utilize the forward pressure to generate power for the functioning of the firearm, because the muzzle of any firearm cannot remain closed and be opened fast enough with combustion to allow the bullet to go out. The two solenoid valves oppositely and diametrically placed terminal to the front end of the cylinder (cylinder 12 or 112) of the present invention add to the efficiency of all the forms of the present invention by allowing the inside bore of cylinder 12 or 112 to be made to a closer tolerance with lesser clearance between piston 23 and the inside bore of cylinder 12 or 112; as the chances of foreign matter getting inside the cylinder or barrel (cylinder 12 or 112) is minimized with the placement of the two solenoid valves terminal to the front end, as explained earlier. In FIG. 1B, gyro-wheel 22 is annularly extended to the rear end of cylinder 112 and centrifugal fan airfoil blades 21 are positioned at the end of gyro-wheel 22 to increase the cooling of cylinder 112. Increasing the length of gyro-wheel 22 altitude-wise to cylinder 112 (compare FIG. 1 with FIG. 1B) also increases the gyroscopic stability to cylinder 112.

The third form of the present invention is essentially identical to the first form of the present invention hereinabove described extensively, except for the manner in which primer-containing combustive material 25 inside canister 38 is brought into combustion. Instead of induction heating and closed-bottom canister, a conventional firearm cartridge with a percussion cap and a primer is used with a tribo-heating (or firing) pin is utilized in the conventionally prevalent manner. This makes the utilization of conventional firearm cartridges possible for cost-effective applications. To achieve this, the magnetic core to linear actuator coil 28 is modified to hold a conventional firing pin. When linear actuator core 36 is released and is forced forward by actuator spring 32, while canister-holder solenoid coil 24 is energized to hold a firearm cartridge made of ferromagnetic material (similar to as described hereinabove), the magnetic pull of canister-holder solenoid coil 24 urges a ferromagnetic firing pin forcefully forward, aided by the conventional forward movement by momentum. The firing pin does the firing of the firearm cartridge entirely in the prevalent manners. What also is different from the earlier two forms of the present invention is the fact that linear actuator coil 28 never acts as an induction heater coil, and remains de-energized at the time of firing; only when firearm cartridge pullback has to be effected, linear actuator coil 28 is supplied with dc power through the means already described earlier hereinbefore.

The fourth form of the present invention is essentially identical to the second form of the present invention herein-above described extensively, except for the manner in which primer-containing combustive material 25 inside canister 38 is brought into combustion, which is fully identical to the manner described in the preceding paragraph to explain the third form of the present invention.

The fifth and sixth forms of the present invention are totally similar respectively to the third and the fourth forms of the present invention described in detail hereinbefore with reference to all the figures, FIG. 1 through FIG. 4, except for the fact, common to both the forms described herein, that the motor-included turbogenerator, functionally described in all the forms of the present invention, is replaced with a simple electric motor. The electric motor is preferably an induction motor, because of the simplicity of construction without the use of permanent magnets on the rotor. Similarly, in another simplification, just a stator assembly (electromagnetic rotor means) again annularly integrated around the front-end base opening to cylinder 12 from which piston 23 (FIG. 2) is ejected by the pressure of the post-combustion exhaust gases, without using any kind of motor-included turbogenerator. An electric power supply also is needed to power the electric motor and/or the stator assembly, the other solenoid coils and/or electromagnets and other electrical and electronic devices utilized to make the present invention function. These two forms of the present invention can be very conveniently used either aboard an aircraft, rotorcraft or a ship, and wherever there is a ready source of electric power.

In the seventh form of the present invention, a motor has a helically arranged, multi-pole permanent magnet stator assembly (rotor means) annularly and fixedly integrated around cylinder 12 (FIG. 2) to impart on the ejected piston 23 a rotatory motion for gyroscopic stability in projectile motion. This form of the present invention can be implemented to all the earlier listed forms of the present invention by replacing the earlier mentioned means to impart a rotatory motion to the ejected piston with this form of the present invention. To aid the understanding of this simple motor, piston 23 in rapid forward motion inside cylinder 12, leading to ejection from cylinder 12 functions as a rotor, if stator winding 13 and stampings 14 from the stator assembly are replaced with multiple magnetic rings, each identical ring having radially dispersed complementary magnetic poles inwardly at angular equidistance. The rings are stacked in the manner stampings 14 are shown stacked in FIG. 2. But while stacking, the poles are located in a twisted manner, which is, when all the magnetic rings are in place, imaginary lines lengthwise in sympathy to the altitude of cylinder 12 running through similar adjacent poles on successive magnetic rings have identical helical forms. This described lengthwise helical form of multiple magnetic poles form a static electromagnetic stator to piston 23 which is of metallic construction, hence is a conductor of electricity and acts as a shorted winding of a linear alternator. The helical pole positioning of the successive magnetic rings imparts a twisting force on piston due to the short-circuit currents flowing in it. To increase the effectiveness of the twisting forces as described, it is important to reduce the gap between the cylindrical cavity formed by the stacking of the magnetic rings and piston 23; this can be done in the manner shown in FIG. 4 with cylinder 112 made in two steps, the rear portion of the cylinder inside which combustion takes place, has a larger outside diameter for strength; the front portion of cylinder 112 has a thin wall and consequently the outside diameter of that portion is less. This mentioned thin wall helps to reduce the gap between the cylindrical cavity formed by the stacking of the magnetic rings and piston 23.

In the eighth form of the present invention, a motor has a helically arranged, multi-pole permanent magnet stator assembly (rotor means) annularly and fixedly integrated around the muzzle-end of the barrel of a firearm of common unrifled construction to impart on an ejected metallic bullet a rotatory motion for gyroscopic stability in projectile motion in the manner described in the preceding paragraph hereinabove explaining the implementation of the seventh form of the present invention. The magnetic and electromagnetic rotor means to impart a rotatory motion on piston 23 or a bullet for gyroscopic stability after ejection from the cylinder or barrel is a marked improvement over conventional rifled construction of the inside of a barrel. Rifling leaves helical friction marks on a conventional bullet, increasing the drag in projectile as well as rotatory motion in the air. Additionally, the electromagnetic rotor means described in preceding paragraphs makes possible that the electric power variably drives through switching devices the electromagnetic rotor means, in order to impart a spin to piston 23 (FIG. 2), which is fully independent of its velocity at the time of its ejection from cylinder 12 or 112.

All the forms of the present invention are significantly different from the conventional firearm practices. It is also possible for persons ordinarily skilled in related art to construct many more versions of the devices of the present invention with the help of the preceding description with reference to the drawings; all the versions are logically placed in an orderly manner in the proceeding section of Claims in a manner as to optimize the complexity and volume of the section of Claims. It is further to be noted that progressively the firearms would become redundant for maiming or warfare, as new, totally different intelligent warfare technologies are quickly emerging. There use would mostly be limited to law enforcement and sports. Because of a significant shift away from the conventional designs, the conventional nomenclature was not appropriate in explaining the present invention in all its forms: like, in the present invention, mechanical rifling is non-existent, barrel and bolt-related mechanisms are totally different from the prevalent art. However, persons conversant with related art can deduce from the detailed description hereinabove the theory and proposed practices required to make all the forms of the devices of the present invention functional.

What is claimed is:

1. A projectile device comprising:
   a cylinder with variable outer diameters, having a cylindrical hollow spanning the entire altitude of said cylinder and having cover means to close the rear-end base of said cylinder;
   external means to hold back a canister, filled with a primer-containing combustive material and locked with a piston, inside said cylindrical hollow;
   an induction heating linear actuator to fire said primer-containing combustive material, leading to the combustion of said primer-containing combustive material effecting the release of said piston from said canister and the ejection of said piston from said cylinder by the pressure of post-combustion exhaust gases from said combustion;
   said piston is at least of outer metallic electrically conductive construction and is imparted a rotatory motion by an electromagnetic rotor means;
   a trigger command for an electronically controlled activation of said induction heating linear actuator to fire said primer-containing combustive material leading to said combustion and said release of said piston from said canister; and
   an electric power source to supply electric power.

2. A projectile device in accordance with claim 1, wherein a motor-included turbogenerator is annularly and rotatably integrated around said cylinder converting the kinetic energy of said post-combustion exhaust gases into electric power which is stored in storage means which are rechargeable batteries and capacitors; and electric power variably drives through switching devices said electromagnetic rotor means comprising a stator assembly annularly integrated around said cylinder, proximate to the front-end base opening to said cylinder from which said ejection of said piston is effected by said pressure of said post-combustion exhaust gases.

3. A projectile device in accordance with claim 2, wherein two solenoid valves are oppositely and diametrically placed terminal to said front-end base opening to said cylinder and are actuated with said trigger command.

4. A projectile device in accordance with claim 3, wherein said motor-included turbogenerator has a rotor with a centrifugal fan axially extending in the direction of the rear-end base of said cylinder and with flywheel means for gyroscopic stability to said cylinder.

5. A projectile device in accordance with claim 1, wherein a motor-included turbogenerator annularly and rotatably integrated around said cylinder converting the kinetic energy of said post-combustion exhaust gases into electric power which is stored in storage means in the form of rechargeable batteries and capacitors; and
   said electromagnetic rotor means comprising a rotating magnetic field leaking inwardly from the stator assembly of said motor-included turbogenerator.

6. A projectile device in accordance with claim 5, wherein two solenoid valves are oppositely and diametrically placed terminal to said front-end base opening to said cylinder and are actuated with said trigger command.

7. A projectile device in accordance with claim 6, wherein said motor-included turbogenerator has a rotor with a centrifugal fan axially extending in the direction of said rear-end base of said cylinder and with flywheel means for gyroscopic stability to said cylinder.

8. A projectile device in accordance with claim 1, wherein said external means to hold back said canister are electromagnetic and are either a canister-holder solenoid with said canister also having a ferromagnetic construction or a clamp-type means comprising two pole pieces with said linear actuator having ferromagnetic properties.

9. A projectile device in accordance with claim 8, wherein a motor-included turbogenerator annularly and rotatably integrated around said cylinder converting the kinetic energy of said post-combustion exhaust gases into electric power which is stored in storage means which are rechargeable batteries and capacitors, and
   said electric power variably drives through switching devices said electromagnetic rotor means comprising a stator assembly annularly integrated around said cylinder, proximate to the front-end base opening to said cylinder from which said ejection of said piston is effected by said pressure of said post-combustion exhaust gases.

10. A projectile device in accordance with claim 9, wherein two solenoid valves are oppositely and diametrically placed terminal to said front-end base opening to said cylinder and are actuated with said trigger command.

11. A projectile device in accordance with claim 9, wherein said motor-included turbogenerator has a rotor with a centrifugal fan axially extending in the direction of said rear-end base of said cylinder and with flywheel means for gyroscopic stability to said cylinder.

12. A projectile device in accordance with claim 8, wherein a motor-included turbogenerator annularly and rotatably integrated around said cylinder converting the kinetic energy of said post-combustion exhaust gases into electric power which is stored in storage means in the form of rechargeable batteries and capacitors; and said rotor means comprising a rotating magnetic field leaking inwardly from the stator assembly of said motor-included turbogenerator.

13. A projectile device in accordance with claim 12, wherein two solenoid valves are oppositely and diametrically placed terminal to said front-end base opening to said cylinder and are actuated with said trigger command.

14. A projectile device in accordance with claim 12, wherein said turbogenerator motor has a rotor with a centrifugal fan axially extending in the direction of said rear-end base of said cylinder and with flywheel means for gyroscopic stability to said cylinder.

15. A gyro-projectile device comprising:

a cylinder with variable outer diameters, having a cylindrical hollow spanning the entire altitude of said cylinder and having cover means to close the rear-end base of said cylinder;

a canister, filled with a primer-containing combustive material and locked with a piston, inside said cylindrical hollow, proximate to said rear-end base;

a motor having a helically arranged, multi-pole permanent magnet stator assembly annularly and fixedly integrated respectively around the front-end of said cylinder to impart on said ejected piston a rotatory motion for gyroscopic stability in projectile motion; said piston of at least externally metallic electrically conductive construction;

said motor having said helically arranged, multi-pole permanent magnet stator assembly annularly and fixedly integrated around the front-end of said cylinder to impart on said ejected piston said rotatory motion for said gyroscopic stability in said projectile motion;

said permanent magnet stator with a plurality of magnetic poles which are radially dispersed with complementary magnetic poles placed in succession, facing radially inward at angular equidistance;

said complementary magnetic poles having magnetic centers which are located along imaginary lines in an identical helical form, said imaginary lines lengthwise in sympathy to the altitude of said cylinder; and said complementary magnetic poles imparting a twisting force on said piston acting as a shorted linear alternator rotor in reaction to short-circuit currents flowing in said piston.

16. A gyro-projectile device in accordance with claim 15, wherein external electromagnetic means magnetically hold back said canister, filled with said primer-containing combustive material and locked with said piston, inside said cylindrical hollow;

an induction heating linear actuator to fire said primer-containing combustive material leading to the combustion of said primer-containing combustion material and the release of said piston from said canister and the ejection of said piston from said cylinder by the pressure of post-combustion exhaust gases;

a trigger command for an electronically controlled activation of either said induction heating linear actuator to fire said primer-containing combustive material leading to said combustion and said release of said piston from said canister; and an electric power source to supply electric power.

17. A gyro-projectile device in accordance with claim 16, wherein a motor-included turbogenerator is annularly and rotatably integrated around said cylinder converting the kinetic energy of said post-combustion exhaust gases into electric power which is stored in storage means in the form of rechargeable batteries and capacitors; and said electric power variably drives through switching devices said electromagnetic rotor means comprising a stator assembly annularly integrated around said cylinder, proximate to said front-end base opening to said cylinder from which said ejection of said piston is effected by said pressure of said post-combustion exhaust gases.

18. A gyro-projectile device in accordance with claim 17, wherein two solenoid valves are oppositely and diametrically placed terminal to said front-end base opening to said cylinder and are actuated with said trigger command.

19. A gyro-projectile device in accordance with claim 18, wherein said motor-included turbogenerator has a rotor with a centrifugal fan axially extending in the direction of said rear-end base of said cylinder and with flywheel means for gyroscopic stability to said cylinder.

20. A gyro-projectile device in accordance with claim 17, wherein said motor-included turbogenerator has a rotor with a centrifugal fan axially extending in the direction of the rear-end base of said cylinder and with flywheel means for gyroscopic stability to said cylinder.

\* \* \* \* \*